United States Patent
Kersting et al.

(10) Patent No.: US 6,174,969 B1
(45) Date of Patent: Jan. 16, 2001

(54) POLYMERIZATION OF $C_2$-$C_8$-ALK-1-ENES BY MEANS OF A ZIEGLER-NATTA

(75) Inventors: Meinolf Kersting, Neustadt; Gerald Lutz, Darmstadt; Franz Langhauser, Ruppertsberg, all of (DE)

(73) Assignee: BASF Aktiengesellschaft, Ludwigshafen (DE)

( * ) Notice: Under 35 U.S.C. 154(b), the term of this patent shall be extended for 0 days.

(21) Appl. No.: 09/108,780

(22) Filed: Jul. 2, 1998

(30) Foreign Application Priority Data

Jul. 2, 1997 (DE) .............................. 197 28 141

(51) Int. Cl.[7] .................. C08F 2/38; C08F 2/40
(52) U.S. Cl. ................. 526/65; 526/129; 526/210; 526/158; 526/348; 502/103
(58) Field of Search ............. 526/65, 129, 210, 526/158, 348; 502/103

(56) References Cited

U.S. PATENT DOCUMENTS

| 4,739,015 | * | 4/1988 | Toyota et al. ........................ 525/270 |
| 4,857,613 | | 8/1989 | Zolk et al. . | |
| 5,288,824 | | 2/1994 | Kerth et al. . | |
| 5,461,115 | * | 10/1995 | Oka ..................................... 525/247 |

FOREIGN PATENT DOCUMENTS

| 61958/96 | * | 2/1997 | (AU) . |
| 41 19 345 | | 12/1992 | (DE) . |
| 44 32 798 | | 3/1996 | (DE) . |
| 195 29 240 | | 2/1997 | (DE) . |
| 31 417 | | 7/1981 | (EP) . |
| 38 478 | | 10/1981 | (EP) . |
| 45 975 | | 2/1982 | (EP) . |
| 45 977 | | 2/1982 | (EP) . |
| 86 473 | | 8/1983 | (EP) . |
| 171 200 | | 2/1986 | (EP) . |
| 192427 | | 8/1986 | (EP) . |
| 234672 | | 9/1987 | (EP) . |
| 749992 | | 12/1996 | (EP) . |
| 000 512 | | 2/1997 | (EP) . |
| 2 111 066 | | 6/1983 | (GB) . |

\* cited by examiner

Primary Examiner—David W. Wu
Assistant Examiner—Ling-Siu Choi
(74) Attorney, Agent, or Firm—Keil & Weinkauf

(57) ABSTRACT $C_2$–$C_8$-Alk-1-enes are polymerized by means of a Ziegler-Natta catalyst system in a reactor cascade comprising at least two reactors, a homo- or copolymer of $C_2$–$C_8$-alk-1-enes being prepared in a reactor $R_A$, upstream of which one or more further reactors may be connected, the reaction mixture being discharged from $R_A$ and transferred to a subsequent reactor $R_B$ and the polymerization in $R_B$ and in the reactors which may be connected to $R_B$ being carried out in the presence of a liquid or dissolved regulator for regulating the catalyst activity, by a process in which the regulator is added to the reaction mixture after discharge from $R_A$ and before entry into $R_B$, and an apparatus for polymerizing $C_2$–$C_8$-alk-1-enes by means of the novel process is described.

10 Claims, 1 Drawing Sheet

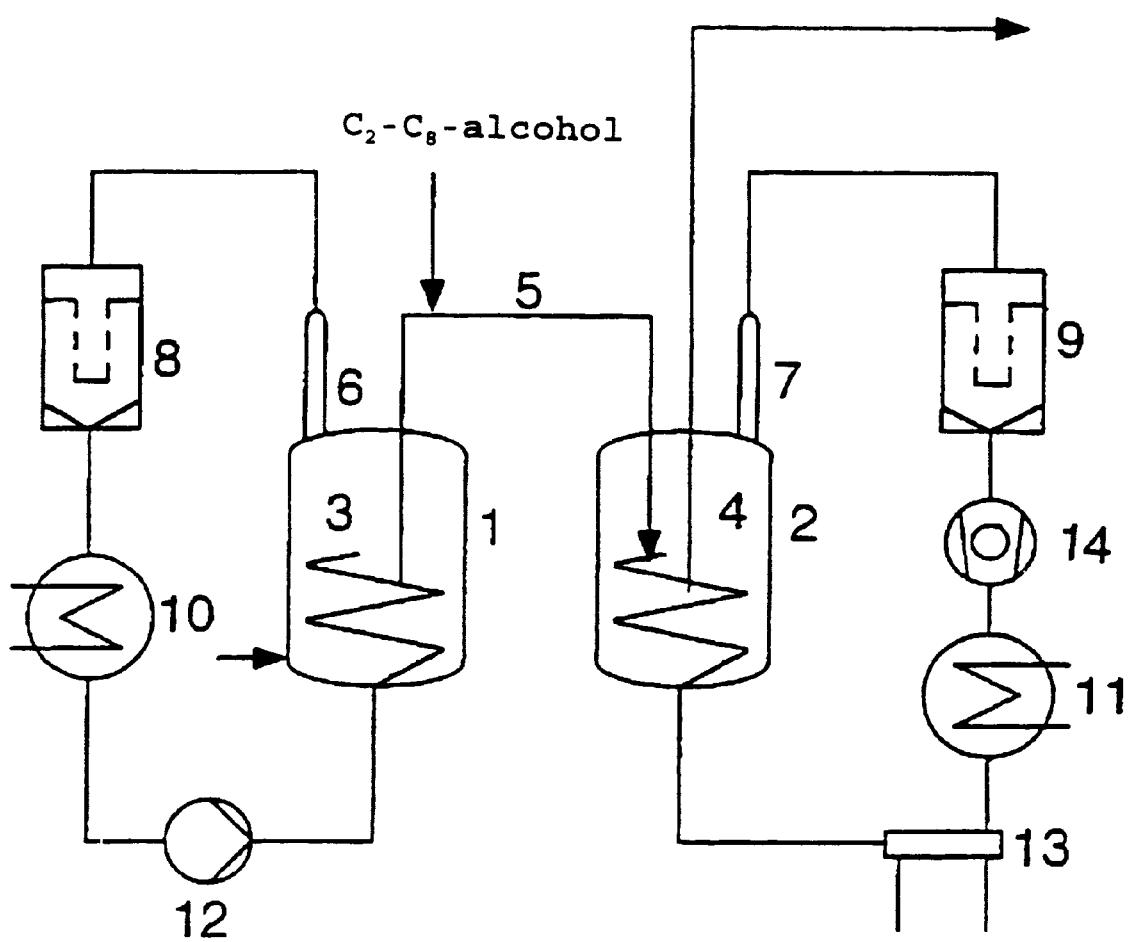

POLYMERIZATION OF $C_2$-$C_8$-ALK-1-ENES BY MEANS OF A ZIEGLER-NATTA

The present invention relates to a process for polymerizing $C_2$–$C_8$-alk-1-enes by means of a Ziegler-Natta catalyst system in a reactor cascade comprising at least two reactors, a homo- or copolymer of $C_2$–$C_8$-alk-1-enes being prepared in one reactor $R_A$, upstream of which one or more further reactors may be connected, the reaction mixture from $R_A$ being discharged and being transferred to a subsequent reactor $R_B$ and the polymerization in $R_B$ and in the reactors which may be connected to $R_B$ being carried out in the presence of a liquid or dissolved regulator for regulating the catalyst activity.

The present invention furthermore relates to an apparatus for polymerizing $C_2$–$C_8$-alk-1-enes by means of the novel process.

Polymers of $C_2$–$C_8$-alk-1-enes may be prepared both by liquid-phase polymerization and by polymerization of a suspension or by gas-phase polymerization. Since the resulting solid polymer can be readily separated from the gaseous reaction mixture, gas-phase polymerization is increasingly being carried out. The polymerization is carried out with the aid of a Ziegler-Natta catalyst system which usually consists of a titanium-containing solid component, an organic aluminum compound and an organic silane compound (EP-B 45 977, EP-A 171 200, U.S. Pat. No. 4,857,613, U.S. Pat. No. 5,288,824).

The polymers of $C_2$–$C_8$-alk-1-enes include the corresponding homopolymers, copolymers and block or impact copolymers. The latter are generally mixtures of different homo- or copolymers of $C_2$–$C_8$-alk-1-enes which in particular have good impact strength. They are usually prepared in reactor cascades comprising at least two reactors connected in series and often in a process involving two or more stages, the polymer obtained in a first reactor being transferred, in the presence of still active Ziegler-Natta catalyst components, to a second reactor in which further monomers are polymerized onto said polymer.

In the preparation of some polymers of $C_2$–$C_8$-alk-1-enes in reactor cascades, in particular in the polymerization of polypropylene block copolymers with more than 20% by weight of a propylene/ethylene copolymer containing from 15 to 80% by weight of ethylene, the occurrence of lumps or agglomerates of the polymer particles and the formation of coatings and build-ups on the reactor walls and reactor baffles are frequently observed in the reactor. This formation of coatings complicates the temperature and reaction control during the copolymerization. The result is that the times on stream of the reactors have to be shortened in order to be able to ensure a controlled reaction in every case. Shorter times on stream of reactors in turn result in an increase in the setup times and hence in the production costs, so that coating adversely affects the cost-efficiency of the preparation of such copolymers.

U.S. Pat. No. 4,739,015, DE-A 41 19 345 and DE-A 44 32 798 disclose processes for the preparation of propylene/ethylene copolymers in which the formation of coatings is substantially reduced by the use of a compound, such as an alkanol, which regulates the catalyst activity. In U.S. Pat. No. 4,739,015, the regulators present in the liquid state are added to the reaction system of the second polymerization stage either directly or diluted with a solvent or, preferably, diluted with a gas. In DE-A 41 19 345 and DE-A 44 32 798, the alkanol is added directly to the reaction mixture of the second polymerization stage. In these processes, however, it is still not possible completely to avoid the formation of coatings.

It is an object of the present invention to remedy the disadvantages described and to provide a process which further reduces or completely suppresses the tendency to agglomeration of the polymer particles and to the formation of coatings.

We have found that this object is achieved by a process for polymerizing $C_2$–$C_8$-alk-1-enes by means of a Ziegler-Natta catalyst system in a reactor cascade comprising at least two reactors, a homo- or copolymer of $C_2$–$C_8$-alk-1-enes being prepared in a reactor $R_A$, upstream of which one or more further reactors may be connected, the reaction mixture from $R_A$ being discharged and being transferred to a subsequent reactor $R_B$ and the polymerization in $R_B$ and in the reactors which may be connected to $R_B$ being carried out in the presence of a liquid or dissolved regulator for regulating the catalyst activity, wherein the regulator is added to the reaction mixture after discharge from $R_A$ and before entry into $R_B$.

$C_2$–$C_8$-Alk-1-enes which in particular may be used in the novel process are ethylene, propylene, but-1-ene, pent-1-ene, hex-1-ene, hept-1-ene or oct-1-ene, ethylene, propylene or but-1-ene being preferably used. The process is suitable for preparing homopolymers of the $C_2$–$C_8$-alk-1-enes or copolymers of $C_2$–$C_8$-alk-1-enes, preferably with up to 30% by weight of other alk-1-enes of up to 8 carbon atoms polymerized herein. Copolymers are to be understood here as meaning both random copolymers and block or impact copolymers.

As a rule, the novel process is used in a polymerization involving two or more stages, i.e. the polymerization conditions define the stages to such an extent that polymers having different properties are produced. For the homopolymers or random copolymers, this may be, for example, the molar mass, i.e. polymers having different molar masses are prepared in the stages for broadening the molar mass distribution. Preferably, different monomers or monomer compositions are polymerized in the stages. This usually leads to block or impact copolymers.

The novel process is particularly suitable for preparing homopolymers of propylene or copolymers of propylene with up to 30% by weight of other alk-1-enes of up to 8 carbon atoms as polymerized units. Here, the copolymers of propylene are random copolymers or block or impact copolymers. If the copolymers of propylene have a random structure, they generally contain up to 15, preferably up to 6,% by weight of other alk-1-enes of up to 8 carbon atoms, in particular ethylene, but-1-ene or a mixture of ethylene and but-1-ene.

The block or impact copolymers of propylene are polymers in which a propylene homopolymer or a random copolymer of propylene with up to 15, preferably up to 6,% by weight of other alk-1-enes of up to 8 carbon atoms is prepared in the first stage and then a propylene/ethylene copolymer containing from 15 to 80% by weight of ethylene is polymerized onto said homopolymer or copolymer in the second stage, it being possible for the propylene/ethylene copolymer additionally to contain further $C_4$–$C_8$-alk-1-enes. As a rule, the propylene/ethylene copolymer is polymerized on in an amount such that the copolymer produced in the second stage accounts for from 3 to 60% by weight in the end product. The novel process is particularly preferred when the amount of the propylene/ethylene copolymer prepared in the second stage is from 20 to 60% by weight.

The polymerization is carried out, according to the invention, by means of a Ziegler-Natta catalyst system. The catalyst systems used are in particular those which, in addition to a titanium-containing solid component a), also contain cocatalysts in the form of organic aluminum compounds b) and electron donor compounds c).

However, Ziegler-Natta catalyst systems based on metallocene compounds may also be used in the novel process.

For the preparation of the titanium-containing solid component a), the titanium compounds generally used are the halides or alcoholates of trivalent or tetravalent titanium, alkoxytitanium halide compounds or mixtures of different titanium compounds also being suitable. Titanium compounds which contain chlorine as halogen are preferably used. The titanium halides which, apart from titanium, contain only halogen are likewise preferred, especially the titanium chlorides and in particular titanium tetrachloride.

The titanium-containing solid component a) preferably contains at least one halogen-containing magnesium compound. Halogens are understood here as chlorine, bromine, iodine or fluorine, bromine and in particular chlorine being preferred. The halogen-containing magnesium compounds are either used directly in the preparation of the titanium-containing solid component a) or are formed during its preparation. Magnesium compounds which are particularly suitable for preparing the titanium-containing solid component a) are the magnesium halides, in particular magnesium chloride or magnesium bromide, or magnesium compounds from which the halides can be obtained in a conventional manner, for example by reaction with halogenating agents, such as alkylmagnesiums, arylmagnesiums, alkoxymagnesium or aryloxymagnesium compounds or Grignard compounds. Preferred examples of halogen-free compounds of magnesium which are suitable for preparing the titanium-containing solid component a) are n-butylethylmagnesium and n-butyloctylmagnesium. Preferred halogenating agents are chlorine and hydrogen chloride. However, the titanium halides, too, may serve as halogenating agents.

In addition, the titanium-containing solid component a) advantageously contains electron donor compounds, for example mono- or polyfunctional carboxylic acids, carboxylic anhydrides or carboxylic esters, or ketones, ethers, alcohols, lactones or organophosphorus or organosilicon compounds.

Electron donor compounds preferably used within the titanium-containing solid component are carboxylic acid derivatives and in particular phthalic acid derivatives of the formula (II)

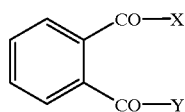

(II)

where X and Y are each chlorine or bromine or $C_1$–$C_{10}$-alkoxy or together are oxygen as an anhydride function. Particularly preferred electron donor compounds are phthalic esters where X and Y are each $C_1$–$C_8$-alkoxy. Examples of preferably used phthalic esters are diethylphthalate, di-n-butyl phthalate, diisobutyl phthalate, di-n-pentyl phthalate, di-n-hexyl phthalate, di-n-heptyl phthalate, di-n-octyl phthalate and di-2-ethylhexyl phthalate.

Further preferred electron donor compounds within the titanium-containing solid component are diesters of 3- or 4-membered unsubstituted or substituted cycloalkane-1,2-dicarboxylic acids and monoesters of substituted benzophenone-2-carboxylic acids. The hydroxy compounds used for these esters are the alkanols usually used in esterification reactions, for example $C_1$–$Cl_5$-alkanols or $C_5$–$C_7$-cycloalkanols, which in turn can carry one or more $C_1$–$C_{10}$-alkyl groups, or $C_6$–$C_{10}$-phenols.

Mixtures of different electron donor compounds may also be used.

In the preparation of the titanium-containing solid component a), as a rule from 0.05 to 2.0, preferably from 0.2 to 1.0, mol of the electron donor compounds are used per mol of the magnesium compound.

In addition, the titanium-containing solid component a) may contain inorganic oxides as carriers. As a rule, a finely divided inorganic oxide which has an average particle diameter of from 5 to 200 μm, preferably from 20 to 70 μm, is used. The average particle diameter is to be understood here as meaning the volume-related median value of the particle size distribution determined by Coulter counter analysis.

The particles of the finely divided inorganic oxide are preferably composed of primary particles which have a median diameter of from 1 to 20 μm, in particular from 1 to 5 μm. The primary particles are porous, granular oxide particles which are generally obtained a hydrogel of the inorganic oxide by milling. It is also possible to sieve the primary particles before they are further processed.

Furthermore, the inorganic oxide preferably to be used also has cavities or channels having an average diameter of from 0.1 to 20 μm, in particular from 1 to 15 μm, whose macroscopic volume fraction is from 5 to 30%, in particular from 10 to 30%, based on the total particle.

The median diameters of the primary particles and the macroscopic volume fraction of the cavities and channels of the inorganic oxide are advantageously determined by image analysis with the aid of scanning electron microscopy and electron probe micro analysis, in each case on particle surfaces and on particle cross-sections of the inorganic oxide. The images obtained are evaluated and the median diameters of the primary particles and the microscopic volume fraction of the cavities and channels are determined therefrom. The image analysis is preferably carried out by conversion of the electron microscopy data into a gray scale binary image and digital evaluation by means of a suitable computer program, for example using the software package Analysis from SIS.

The inorganic oxide preferably to be used can be obtained, for example, by spray-drying the milled hydrogel, which is mixed with water or an aliphatic alcohol for this purpose. Such finely divided inorganic oxides are also commercially available.

The finely divided inorganic oxide furthermore usually has a pore volume of from 0.1 to 10, preferably from 1.0 to 4.0 cm$^3$/g and a specific surface area of 10 to 1000, preferably from 100 to 500, m$^2$/g, where the values determined by mercury porosimetry according to DIN 66133 and by nitrogen adsorption according to DIN 66131 are to be understood here.

It is also possible to use an inorganic oxide with a pH, i.e. the negative logarithm to the base 10 of the proton concentration, is from 1 to 6.5, in particular from 2 to 6.

Particularly suitable inorganic oxides are the oxides of silicon, of aluminum, of titanium or of one of the metals of main group I or II of the Periodic Table. In addition to alumina or magnesium oxide or a sheet silicate, a particularly preferably used oxide is silica (silica gel). Mixed oxides, such as aluminum silicates or magnesium silicates, may also be used.

The inorganic oxides used as carriers contain water on their surface. Some of this water is physically bound by adsorption and some is chemically bound in the form of hydroxyl groups. The water content of the inorganic oxide can be reduced or completely eliminated by thermal or chemical treatment, conventional drying agents, such as SiCl$_4$, chlorosilanes or alkylaluminums, generally being used in chemical treatment. The water content of suitable inorganic oxides is from 0 to 6% by weight. Preferably, an inorganic oxide in the form of the commercially available material is used without further treatment.

The magnesium compound and the inorganic oxide are present within the titanium-containing solid component a) preferably in amounts such that from 0.1 to 1.0, in particular from 0.2 to 0.5, mol of the compound of magnesium is present per mol of the inorganic oxide.

In the preparation of the titanium-containing solid component a), C$_1$–C$_8$-alkanols, such as methanol, ethanol, n-propanol, isopropanol, n-butanol, sec-butanol, tert-butanol, isobutanol, n-hexanol, n-heptanol, n-Octanol or 2-ethylhexanol or mixtures thereof, are as a rule also used. Ethanol is preferably used.

The titanium-containing solid component can be prepared by methods known per se. Examples of these are described, inter alia, in EP-A 45 975, EP-A 45 977, EP-A 86 473, EP-A 171 200, GB-A 2 111 066, U.S. Pat. No. 4,857,613 and U.S. Pat. No. 5,288,824. The process disclosed in DE-A 195 29 240 is preferably used.

Other suitable aluminum compounds b) besides trialkylaluminum are those compounds in which an alkyl group has been replaced by an alkoxy group or by a halogen atom, for example by chlorine or bromine. The alkyl groups may be identical or different. Linear or branched alkyl groups are suitable. Trialkylaluminum compounds whose alkyl groups each have 1 to 8 carbon atoms are preferably used, for example trimethylaluminum, triethylaluminum, triisobutylaluminum, trioctylaluminum or methyldiethylaluminum or mixtures thereof.

In addition to the aluminum compound b), as a rule electron donor compounds c), such as mono- or polyfunctional carboxylic acids, carboxylic anhydrides or carboxylic esters, or ketones, ethers, alcohols, lactones and organophosphorus and organosilicon compounds, are used as a further cocatalyst, it being possible for the electron donor compounds c) to be identical to or different from the electron donor compounds used for the preparation of the titanium-containing solid component a). Preferred electron donor compounds are organosilicon compounds of the formula (I)

$$R^1{}_n Si(OR^2)_{4-n} \quad (I)$$

where the radicals R$^1$ are identical or different and are each C$_1$–C$_{20}$-alkyl, 5- to 7-membered cycloalkyl, which in turn may be substituted by C$_1$–C$_{10}$-alkyl, or C$_6$–C$_{18}$-aryl or C$_6$–C$_{18}$-aryl-C$_1$–C$_{10}$-alkyl, the radicals R$^2$ are identical or different and are each C$_1$–C$_{20}$-alkyl and n is the integer, 1, 2 or 3. Particularly preferred compounds are those in which R$^1$ is C$_1$–C$_8$-alkyl or 5- to 7-membered cycloalkyl and R$^2$ is C$_1$–C$_4$-alkyl and n is 1 or 2.

Among these compounds, dimethoxydiisopropylsilane, dimethoxyisobutylisopropylsilane, dimethoxydiisobutylsilane, dimethoxydicyclopentylsilane, dimethoxyisopropyl-tert-butylsilane, dimethoxyisobutyl-sec-butylsilane and dimethoxyisopropyl-sec-butylsilane are particularly noteworthy.

The cocatalysts b) and c) are preferably used in an amount such that the atomic ratio of aluminum from the aluminum compound b) and titanium from the titanium-containing solid component a) is from 10:1 to 800:1, in particular from 20:1 to 200:1, and the molar ratio of the aluminum compound b) to the electron donor compound c) is from 1:1 to 250:1, in particular from 10:1 to 80:1.

The titanium-containing solid component a), the aluminum compound b) and the generally used electron donor compound c) together form the Ziegler-Natta catalyst system. The catalyst components b) and c) may be introduced into the polymerization reactor together with the titanium-containing solid component a) or as a mixture or individually in any desired order.

Ziegler-Natta catalyst systems based on metallocene compounds may also be used in the novel process.

Metallocenes are to be understood here as meaning complex compounds of metals of subgroups of the Periodic Table with organic ligands which, together with compounds forming the metallocenium ions, give effective catalyst systems. For use in the novel process, the metallocene complexes are present in the catalyst system as a rule on a carrier. Frequently used carriers are inorganic oxides. The inorganic oxides described above, which are also used for the preparation of the titanium-containing solid component a), are preferred.

Metallocenes usually used contain titanium, zirconium or hafnium as a central atom, zirconium being preferred. In general, the central atom is bonded via a π-bond to at least one, as a rule substituted, cyclopentadienyl group and to further substituents. The further substituents may be halogens, hydrogen or organic radicals, fluorine, chlorine, bromine or iodine or C$_1$–C$_{10}$-alkyl being preferred.

Preferred metallocenes contain central atoms which are bonded to two substituted cyclopentadienyl groups via two π-bonds, particularly preferred being those in which substituents of the cyclopentadienyl groups are bonded to both cyclopentadienyl groups. Particularly preferred complexes are those with cyclopentadienyl groups additionally substituted by cyclic groups on two neighboring carbon atoms.

Other preferred metallocenes are those which contain only one cyclopentadienyl group, which however is substituted by a radical which is also bonded to the central atom.

Examples of suitable metallocene compounds are ethylenebis(indenyl)zirconium dichloride, ethylenebis(tetrahydroindenyl)zirconium dichloride, diphenylmethylene-9-fluorenylcyclopentadienylzirconium dichloride, dimethylsilanediylbis(3-tert-butyl-5-methylcyclopentadienyl)zirconium dichloride, dimethylsilanediylbis(2-methylindenyl)zirconium dichloride, dimethylsilanediylbis(2-methylbenzindenyl) zirconium dichloride, dimethylsilanediylbis(2-methyl-4-phenylindenyl)zirconium dichloride, dimethylsilanediylbis (2-methyl-4-naphthylindenyl)zirconium dichloride, dimethylsilanediylbis(2-methyl-4-isopropylindenyl) zirconium dichloride and dimethylsilanediylbis(2-methyl-4,6 -diisopropylindenyl)zirconium dichloride and the corresponding dimethylzirconium compounds.

The metallocene compounds are either known or are obtainable by methods known per se.

Furthermore, the metallocene catalyst systems contain compounds which form metallocenium ions. Strong, neutral Lewis acids, ionic compounds having Lewis acid cations or ionic compounds having Brönsted acids as cations are suitable. Examples of these are tris(pentafluorophenyl) borane, tetrakis(pentafluorophenyl)borate and N,N-dimethylanilinium salts. Other suitable compounds which form metallocenium ions are open-chain or cyclic aluminoxane compounds. These are usually prepared by reacting a trialkylaluminum with water and are present as a rule in the form of mixtures of both linear and cyclic chain molecules of different lengths.

Moreover, the metallocene catalyst systems may contain organometallic compounds of the metals of main group I, II or III in the Periodic Table, such as n-butyllithium, n-butyl-n-octylmagnesium, triisobutylaluminum, triethylaluminum or trimethylaluminum.

The novel process is carried out by polymerization in a reactor cascade comprising at least two reactors connected in series. The conventional reactors used for polymerizing $C_2$–$C_8$-alk-1-enes may be used, it being possible to carry out the polymerization either in the gas phase, in solution, in liquid monomers or in a suspension. Suitable reactors include continuously operated stirred kettles, loop reactors and fluidized-bed reactors. The size of the reactors is not important for the novel process. It depends on the output which is to be achieved with the reactor cascade.

The novel process is particularly advantageous if the polymerization in reactor $R_B$, into which the reaction mixture with the added regulator is introduced, is carried out in the gas phase. Here, the polymerization in $R_A$ and in the reactors which may be connected upstream of $R_A$ may be effected both in the liquid phase and in the gas phase. In a preferred embodiment, the polymerization in all reactors is carried out in the gas phase. Suitable gas-phase reactors here are fluidized-bed reactors and horizontally or vertically stirred powder bed reactors. In the novel process, the reaction bed generally consists of the polymer of $C_2$–$C_8$-alk-1-enes which is prepared by polymerization in the respective reactor.

In a particularly preferred embodiment, the novel process is carried out in a cascade of gas-phase reactors, in which the pulverulent reaction bed is kept in motion by a vertical stirrer, cantilever helical ribbon impellers being particularly suitable. Such stirrers are disclosed, inter alia, in EP-B 000 512 and EP-B 031 417. In particular, they distribute the pulverulent reaction bed very homogeneously. Examples of such pulverulent reaction beds are described in EP-B 038 478. The reactor cascade preferably consists of two kettle-like reactors connected in series, provided with a stirrer and having a capacity of from 0.1 to 100 m³, for example 12.5, 25, 50 or 75 m³.

The point at which the regulator is added to the reaction mixture is advantageously to be chosen as close as possible to $R_A$. The transferred polymer and the regulator are then in contact with one another for a very long time during the transfer. This is ensured by adding the regulator in the first half, preferably in the first third, of the transfer means. However, it must be ensured that the liquid or dissolved regulator is not added in such a way that it can run back into $R_A$. Preferably, the regulator is metered continuously into the transfer means. This also applies when the polymer obtained in $R_A$ is transferred batchwise, together with unconverted monomers and still active Ziegler-Natta catalyst components, to $R_B$. The regulator can be added by conventional metering apparatus, for example a pump or a pressurized vessel.

BRIEF DESCRIPTION OF THE DRAWING

A particularly preferred embodiment is shown schematically in the FIGURE below. Said embodiment consists of two reactors $R_A$ (1) and $R_B$ (2) which are connected in series and each of which is provided with a cantilever helical ribbon impeller (3) and (4).

The two reactors are connected to one another by at least one pipe as transfer means (5), through which the polymer formed in $R_A$(1) is discharged and transferred to $R_B$ (2) and in which, according to the invention, the regulator is added to the reaction mixture. The pipes usually used in polymerization technology and generally consisting of stainless steel are employed. Advantageously, the regulator is added as far as possible at the beginning of the pipe (5), in particular in the first half of the pipe.

Unconsumed, gaseous monomers are each removed from the top of the reactor, i.e. at the upper reactor end, initially via a further pipe (6) or (7), and are then each separated from entrained polymer particles by means of a circulation gas filter (8) or (9). Thereafter, the monomers from $R_A$ (1) are liquefied with the aid of a condenser (10) and recycled by means of a pump (12), as liquids or as a two-phase mixture together with fresh monomers, to $R_A$ (1) where they rapidly vaporize under the prevailing conditions. The monomers from $R_B$ (2) are compressed with the aid of a compressor (14) installed between the circulation gas filter (9) and the condenser (10) and are then either liquefied by condensers (11) and (13) and cooled to lower temperatures or, with higher compression, are let down again to reaction pressure, corresponding cooling occurring as a result of the Joule-Thompson effect. As a result of this gas circulation in association with the evaporative cooling by the monomers introduced in liquid form, the heat of reaction generated during the polymerization can be rapidly removed and thorough mixing of the pulverulent reaction bed with monomers can be ensured.

The apparatus, which is likewise according to the invention, is to be understood as meaning a cascade comprising at least two reactors, which are each connected to one another by at least one transfer means through which the reaction mixture comprising polymer, unconverted monomers and still active Ziegler-Natta catalyst components is discharged from one reactor and transferred to the subsequent reactor, a metering apparatus for adding a liquid or dissolved regulator being present on a transfer means, for example a pipe, through which the polymer is discharged from a reactor and transferred to a subsequent reactor. Advantageously, the metering apparatus is, or the metering apparatuses are, arranged as far as possible at the beginning of the transfer means, i.e. in the first half and in particular in the first third of the transfer means.

In the novel process, the polymerization is carried out in the presence of a liquid or dissolved regulator for regulating the catalyst activity. Particularly suitable regulators are compounds which contain active hydrogen, such as water, alcohols, phenols, carboxylic acids, sulfonic acids or primary or secondary amines. Specific examples are saturated or unsaturated aliphatic, alicyclic or aromatic alcohols of 1 to 18 carbon atoms, eg. methanol, ethanol, n-propanol, isopropanol, n-butanol, tert-butanol, n-hexanol, n-octanol, ethylene glycol, propylene glycol, diethylene glycol, cyclohexanol, benzyl alcohol or glycerol; phenols, such as phenol, cresol, xylenol or other alkyl-substituted phenols; aliphatic, alicyclic or aromatic carboxylic acids, eg. formic acid, acetic acid, propionic acid, butyric acid, acrylic acid, benzoic acid or stearic acid; sulfonic acids, such as methanesulfonic acid, ethanesulfonic acid, benzenesulfonic acid or toluenesulfonic acid; primary amines, such as ethylamine, isopropylamine, cyclohexylamine or aniline, and secondary amines, eg. dimethylamine, di-n-butylamine, dibenzylamine or piperidine. Aliphatic alcohols, in particular those of 1 to 8 carbon atoms are particularly preferred, isopropanol being very particularly preferred. It is also possible to use a mixture of two or more regulators.

The function of the regulators metered according to the invention into the transfer means is to regulate the activity of the catalyst system in $R_B$ and in the reactors which may be connected to $R_B$ in such a way that the ratio of the polymers formed in the reactors can be exactly adjusted. This is achieved in general by reducing the polymerization activity in $R_B$. Moreover, the purpose of the regulators is to reduce the formation of lumps or agglomerates of polymer particles and the formation of coatings and build-ups on the reactor walls and reactor baffles. When used in accordance with the novel process, they are particularly capable of fulfilling this purpose.

In the novel process, polymerization is carried out under conventional reaction conditions at from 40 to 120° C. and from 1 to 100 bar. Temperatures of from 40 to 100° C. and pressures of from 10 to 50 bar are preferred. The molar mass of the resulting polymers of the $C_2$–$C_8$-alk-1-enes can be controlled and established by adding regulators usually used in polymerization technology, for example hydrogen. The polymers of the $C_2$–$C_8$-alk-1-enes generally have a melt flow rate (MFR) of from 0.1 to 100 g/10 min., at 230° C. and under a weight of 2.16 kg. The melt flow rate corresponds to the amount of polymer which is forced, in the course of 10 minutes at 230° C. and under a weight of 2.16 kg, out of the test apparatus standardized according to ISO 1133. Particularly preferred monomers are those whose melt flow rate is from 0.1 to 20 g/10 min, at 230° C. and under a weight of 2.16 kg.

In the preparation of propylene block copolymers, usually propylene is homopolymerized or is copolymerized with up to 15% by weight of other alk-1-enes of up to 8 carbon atoms at from 15 to 40 bar and from 50 to 120° C. in the first stage and then, in the second stage, a mixture of propylene and ethylene which may additionally contain other $C_4$–$C_8$-alk-1-enes is copolymerized, at from 5 to 30 bar and from 30 to 100° C., in a manner such that the resulting copolymer contains from 15 to 80% by weight of ethylene. It is also possible for this to be followed by a third polymerization stage in which, for example, an ethylene copolymer is formed. One, two or more reactors may be used for each polymerization stage. The regulator is preferably added between the first stage and the second stage, i.e. $R_A$ is the last reactor of the first stage and $R_B$ is the first reactor of the second stage. In the case of cascades which consist of more than two reactors, it is also possible to add regulator several times, i.e. the cascade then contains a plurality of reactors $R_A$ and a plurality of reactors $R_B$.

In particular, the two-stage polymerization is carried out only in two reactors $R_A$ and $R_B$. In this case, pressures of from 17 to 35 bar and temperatures of from 65 to 110° C. are preferred in $R_A$ and pressures of from 10 to 25 bar and temperatures of from 40 to 80° C. in $R_B$. Hydrogen may be used as the molecular weight regulator in both reactors. The pressure in $R_A$ should advantageously be at least 10, particularly at least 7, bar higher than the pressure in $R_B$.

The average residence times are in general from 0.5 to 5 hours in the first reactor and from 0.25 to 4 hours in the second reactor. Preferred novel processes have average residence times of from 0.6 to 4, in particular from 0.7 to 3, hours in the first reactor and from 0.3 to 3.5, in particular from 0.35 to 2.5, hours in the second reactor.

With the aid of the novel process, $C_2$–$C_8$-alk-1-enes can be polymerized in the presence of a Ziegler-Natta catalyst system with a substantially smaller tendency to form lumps or agglomerates of the polymer particles and coatings and build-ups on the reactor walls and reactor baffles. Consequently, the time on stream of the plants can be increased and the number of cleaning steps is reduced, making the process more economical overall.

By means of the novel process or the novel apparatus, it is possible to prepare different types of polymers of $C_2$–$C_8$-alk-1-enes, for example homopolymers, copolymers or mixtures of such polymers. These are particularly suitable for the production of films, fibers or moldings.

EXAMPLES

The propylene polymers were prepared in a two-stage polymerization in a cascade or two vertically stirred gas-phase reactors $R_A$ and $R_B$ connected in series and each having a capacity of 12.5 m³. Both reactors contained an agitated fixed bed of finely divided polymer. Before each experiment, the reactors were opened, the reactor walls and reactor baffles were cleaned to remove coatings and the reactors were then filled with a lump-free and agglomerate-free powder bed.

In all experiments, a catalyst system which contained a titanium-containing solid component $a_1$) prepared by the following process was used:

In a first stage, a solution of n-butyloctylmagnesium in n-heptane was added to a finely divided silica gel which had a median particle diameter of 30 µm, a pore volume of 1.5 cm³/g and a specific surface area of 260 m²/g, 0.3 mol of magnesium compound being used per mol of $SiO_2$. The finely divided silica gel was additionally characterized by a median primary particle size of 3–5 µm and by cavities and channels having a diameter of 3–5 µM, the macroscopic volume fraction of the cavities and channels being about 15%, based on the total particle. The solution was stirred for 45 minutes at 95° C., and then cooled to 20° C., after which a 10-fold molar amount, based on the organomagnesium compound, of hydrogen chloride was passed in. After 60 minutes, 3 mol of ethanol per mol of magnesium were added to the reaction product with continuous stirring. This mixture was stirred for 0.5 hours at 80° C., after which 7.2 mol of titanium tetrachloride and 0.5 mol of di-n-butyl phthalate, based in each case on 1 mol of magnesium, were added. Stirring was then carried out for 1 hour at 100° C. and the solid substance obtained was filtered off and washed several times with ethylbenzene.

The resulting solid product was extracted for 3 hours at 125° C. with a 10% strength by volume solution of titanium tetrachloride in ethylbenzene. Thereafter, the solid product was separated from the extracting agent by filtration and washed with n-heptane until the extracting agent contained only 0.3% by weight of titanium tetrachloride.

The titanium-containing solid component $a_1$) contained
3.5% by weight of Ti
7.4% by weight of Mg
28.2% by weight of Cl.

Comparative Example A

In the first polymerization stage, propylene was polymerized in reactor $R_A$ at 30 bar and 80° C. and with an average residence time of 2.2 hours, in the presence of hydrogen as molecular weight regulator. The catalyst system used comprised the titanium-containing catalyst solid $a_1$) together with the cocatalysts triethylaluminum and dimethoxyisobutylisopropylsilane. 0.3 kg of triethylaluminum and 56 g of dimethoxyisobutylisopropylsilane were used per metric ton of propylene fed to the reactor. A propylene homopolymer having a melt flow rate (MFR) of 12.1 g/10 min (at 230° C. and 2.16 kg according to ISO 1133) was obtained.

The polymer formed in $R_A$ was discharged batchwise from $R_A$ and transferred together with unconverted monomers and still active Ziegler-Natta catalyst components to $R_B$.

In the second polymerization stage, a mixture of propylene and ethylene was polymerized, at 20 bar and 70° C., onto the propylene homopolymer formed in $R_A$, the ratio of the partial pressures of propylene and ethylene being 1.8 and the weight ratio of the propylene homopolymer obtained in the first reactor to the propylene/ethylene copolymer formed in the second reactor being 1.7.

To regulate the polymer produced in the second polymerization stage, a 17% strength by weight solution of isopropanol in heptane was metered continuously and directly into $R_B$. 2.0 mol of isopropanol were used per mol of aluminum component.

The propylene/ethylene block copolymer obtained had a melt flow rate (MFR) of 2.1 g/10 min (at 230° C. and 2.16 kg according to IS 1133).

After a time on stream of 3 weeks, $R_B$ was opened. The amount of lumps and agglomerates formed in the powder bed (particles having a diameter greater than 25 mm) was determined and the amount of coatings built up on the reactor baffles and on the reactor walls as weighed after mechanical removal.

Example 1

Comparative example A was repeated in a similar manner, except that the 17% strength by weight solution of isopropanol in heptane was metered continuously into the transfer line connecting $R_A$ and $R_B$, under otherwise identical conditions. The addition was effected immediately after the discharge from $R_A$ after about 30% of the total length of the transfer line.

After a time on stream of 3 weeks, $R_B$ was opened. The amount of lumps and agglomerates formed in the powder bed was determined and the amount of coatings built up on the reactor baffles and on the reactor walls was weighed after mechanical removal.

The amount of lumps and agglomerates in the powder bed of $R_B$ was reduced to 45% of the amount of the comparative example A. And the amount of coatings and build-ups was only 35% of those of comparative example A.

Comparative Example B

In $R_A$, a mixture of propylene and ethylene was polymerized at 28 bar and 70° C. and with an average residence time of 2.4 hours in the presence of hydrogen as a molecular weight regulator, the ratio of the partial pressures of propylene and ethylene being 97:1. The catalyst system used comprised the titanium-containing catalyst solid $a_1$) together with the cocatalysts triethylaluminum and dimethoxyisobutylisopropylsilane. 0.3 kg of triethylaluminum and 61 g of dimethoxyisobutylisopropylsilane were used per metric ton of propylene fed to the reactor. A propylene/ethylene copolymer having a melt flow rate (MFR) of 5.5 g/10 min (at 230° C. and 2.16 kg according to ISO 1133) was obtained.

The polymer formed in $R_A$ was discharged batchwise from $R_A$ and transferred together with unconverted monomers and still active Ziegler-Natta catalyst components to $R_B$.

In the second polymerization stage, a mixture of propylene and ethylene was polymerized, at 15 bar and 800C, onto the copolymer formed in $R_A$, the ratio of the partial pressures of propylene and ethylene being 1.7 and the weight ratio of the polymer obtained in $R_A$ to the propylene/ethylene copolymer formed in $R_B$ being 1.2.

To regulate the polymer produced in the second polymerization stage, a 17% by weight solution of isopropanol in heptane was metered continuously and directly into $R_B$. 0.6 mol of isopropanol was used per mol of the aluminum component.

The propylene/ethylene block copolymer obtained had a melt flow rate (MFR) of 1.9 g/10 min (at 230° C. and 2.16 kg according to ISO 1133).

After a time on stream of 3 weeks, $R_B$ was opened. The amount of lumps and agglomerates formed in the powder bed was determined and the amount of coatings which had built up on the reactor baffles and on the reactor walls was weighed after mechanical removal.

Example 2

Comparative example B was repeated in a similar manner, except that the 17% strength by weight solution of isopropanol in heptane was metered continuously into the transfer line connecting $R_A$ and $R_B$, under otherwise identical conditions. The addition was effected immediately after the discharge from $R_A$ after about 30% of the total length of the transfer line.

After a time on stream of 3 weeks, $R_B$ was opened. The amount of lumps and agglomerates formed in the powder bed was determined and the amount of coatings which had built up on the reactor baffles and on the reactor walls was weighed after mechanical removal.

The amount of lumps and agglomerates in the powder bed of $R_B$ was reduced to 35% of the amount of the comparative example B. And the amount of coatings and build-ups was only 25% of those of comparative example B.

We claim:

1. A process for polymerizing $C_2$–$C_8$-alk-1-enes by means of a Ziegler-Natta catalyst system in a reactor cascade comprising at least two reactors, a homo- or copolymer of $C_2$–$C_8$-alk-1-enes being prepared in a reactor $R_A$, upstream of which one or more further reactors may be connected, the reaction mixture from $R_A$ being discharged and being transferred to a subsequent reactor $R_B$ and the polymerization in $R_B$ being carried out in the presence of a liquid or dissolved regulator for regulating the catalyst activity, wherein the regulator is added to the reaction mixture after discharge from $R_A$ and before entry into $R_B$, and wherein the regulator is selected from the group consisting of water, phenols, carboxylic acids, sulfonic acids primary or secondary amines, methanol, ethanol, n-propanol, isopropanol, n-butanol, tert-butanol, n-hexanol, n-octanol, cyclohexanol, benzyl alcohol, and glycerol.

2. The process of claim 1 wherein the $C_2$–$C_8$-alk-1-enes are homo- and/or copolymers of propylene.

3. The process of claim 1, wherein the Ziegler-Natta catalyst system contains, as a carrier, an inorganic oxide which has a median particle diameter of from 5 to 200 $\mu$m, a median primary particle diameter of from 1 to 20 $\mu$m and cavities or channels having an average diameter of from 0.1 to 20 $\mu$m, whose macroscopic volume fraction is from 5 to 30%, based on the total particle.

4. The process of claim 1, wherein the polymerization in $R_B$ takes place from the gas phase.

5. The process of claim 1, wherein the polymerization is carried out in a cascade of gas-phase reactors, each of which is filled with a bed of finely divided polymer which is kept in motion by means of a stirrer.

6. The process of claim 1, wherein the regulator is added to the reaction mixture in the first half of the transfer means connecting the reactors $R_A$ and $R_B$.

7. The process of claim 1, wherein the polymer obtained in $R_A$ is discharged batchwise from $R_A$ and transferred together with unconverted monomers and still active Ziegler-Natta catalyst components to $R_B$, and the regulator is metered continuously into the transfer means.

8. The process of claim 1, wherein the regulator is a compound which contains active hydrogen.

9. A process as claimed in claim 8, wherein the regulator is selected from the group consisting of ethanol, n-propanol, isopropanol, n-butanol, tert-butanol, n-hexanol, n-octanol.

10. The process of claim 1, in which, in a process involving two or more stages, a homo- or copolymer of propylene with up to 15% by weight of other alk-1-enes of up to 8 carbon atoms is first prepared in a first stage and then, in a second stage, a propylene/ethylene copolymer containing from 15 to 80% by weight of ethylene is polymerized thereon, it being possible for the propylene/ethylene copolymer additionally to contain further $C_4$–$C_8$-alk-1-enes, wherein the last reactor of the first stage is $R_A$ and the first reactor of the second stage is $R_B$.

* * * * *